March 12, 1940. O. W. HOLDEN Re. 21,391

SUCTION CUP WALL SHOWER BRACKET

Original Filed Feb. 28, 1939

INVENTOR.
Orloff W. Holden,
BY Cromwell, Greist & Warden
ATTORNEYS.

Reissued Mar. 12, 1940

Re. 21,391

UNITED STATES PATENT OFFICE 21,391

SUCTION CUP WALL SHOWER BRACKET

Orloff W. Holden, Chicago, Ill., assignor to Knickerbocker Rubber Company, Chicago, Ill., a corporation of Illinois Original No. 2,171,875, dated September 5, 1939, Serial No. 258,865, February 28, 1939. Application for reissue October 9, 1939, Serial No. 298,711

3 Claims. (Cl. 248—75)

The principal object of this invention is to provide an improved suction cup wall shower bracket which can be easily applied to a wall, has an increased and better distributed gripping effect, will not loosen its hold under the twisting and wrenching strains caused by the pressure of the water in flowing through the rubber tubing to the spray head, permits any desired adjustment of the spray head, allows the tubing and spray head to be inserted or removed without disturbing the bracket or requiring any separation of the parts, and is quite inexpensive to manufacture.

While the foregoing statements are indicative in a general way of the nature of the invention, other more specific objects and advantages will be apparent to those skilled in the art upon a full understanding of the construction of the improved bracket.

A preferred embodiment of the invention is presented herein for the purpose of exemplification, but it will of course be appreciated that the invention is susceptible of incorporation in other structurally modified forms coming equally within the scope of the appended claims.

Figure 1:
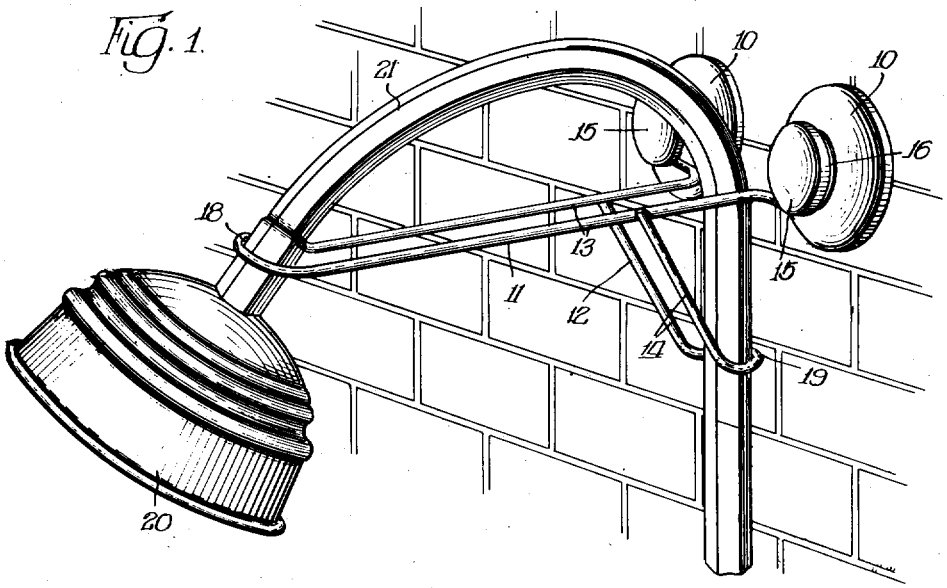
Fig. 1 is a perspective view of the improved suction cup wall shower bracket, showing the same supporting a shower spray against a wall.
Figure 2:
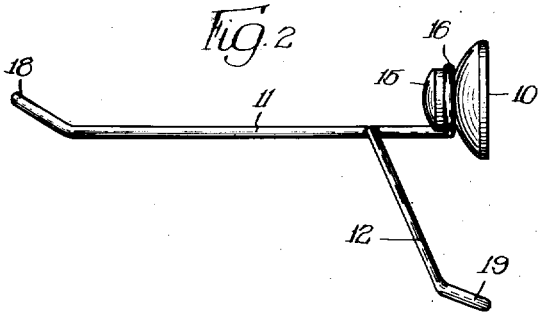
Fig. 2 is a side view of the bracket.
Figure 4:
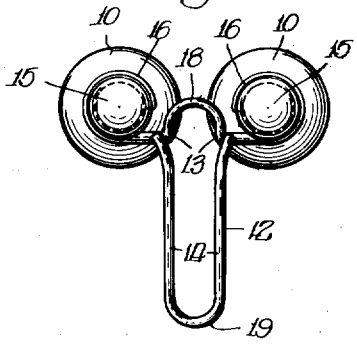
Fig. 4 is a front view.
Figure 3:
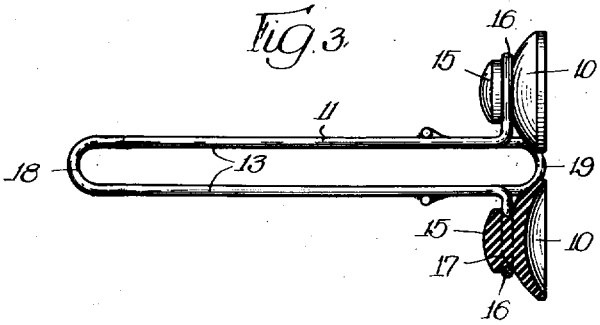
Fig. 3 is a plan view, with one of the suction cups shown in section.

The novel shower spray support shown in the drawing includes a pair of horizontally spaced rubber suction cups 10 which are arranged with their faces in the same vertical plane, and an outwardly projecting metal bracket 11 which is attached to the cups 10 and is provided with a downwardly inclined metal arm 12 which terminates below the cups in substantially the plane of the latter. The bracket 11 is preferably made of round wire, in two horizontally spaced parallel side sections 13, and the arm 12 is also preferably made of round wire, in two horizontally spaced parallel side sections 14.

The suction cups 10 are preferably provided with integrally formed button-like heads 15 at the centers of the same, and the inner ends of the wire side sections 13 of the bracket 11 are bent outwardly away from each other and curved into eyes 16 which fit over the heads 15 on the cups in tightly constricting engagement with the necks 17 of the heads. From the cups 10 the wire side sections 13 of the bracket 11 extend horizontally outward and are connected together at their outer ends by a U-shaped bend 18, which bend is preferably formed at a slight upwardly tilted angle to the main part of the bracket. The upper ends of the wire side sections 14 of the arm 12 are spread apart slightly and welded to the outer surfaces of the wire side sections 13 of the bracket 11, and the lower ends of the sections 14 are connected together by a U-shaped bend 19, which bend is preferably formed at a slight upwardly tilted angle to the main part of the arm.

In applying the bracket to a wall, the rims of the suction cups 10 are moistened and pressed firmly against the wall to flatten out the cups and evacuate the air from within the same. This will cause the cups to firmly grip the wall, with the lower end of the bracing arm 12 in engagement with the wall beneath the cups on a vertical line which is equidistant from the centers of the latter.

The shower spray—which ordinarily consists of a spray head 20 and a length of rubber tubing 21—is assembled with the bracket from the bottom of the latter. The spray head 20 is positioned in front of the upwardly tilted U-shaped bend 18 formed in the wire at the outer end of the bracket, and the adjoining portion of the tubing is pushed up into the slot present between the wire side sections 13 of the bracket, and is at the same time pushed back into the slot present between the wire side sections 14 of the arm into the U-shaped bend 19 at the back of the bracket.

The tubing will thereupon be snugly engaged by the bracket (1) at the U-shaped bend 18, (2) at the U-shaped bend 19, and (3) in the space present between the inner ends of the wire side portions 13 of the bracket, these three points of engagement being located at the corners of a right-angled triangle which is disposed in the same vertical plane as the tubing when bent into the operative gooseneck formation shown.

The improved support is of extremely simple yet sturdy construction, presents an attractive appearance, and is quite inexpensive to manufacture. It affords a much more satisfactory mounting for a shower spray than anything which has heretofore been devised for that purpose. By using two suction cups instead of the usual single cup, not only is a greater gripping power obtained, but the gripping power is distributed to better advantage. Because of the horizontally projecting arrangement of the bracket with respect to the suction cups, and the addition of the bracing arm for the bracket beneath the cups on a vertical line equidistant from the latter, the cups are subjected to an indirect pull only, the bracket proper carrying the weight of the shower spray and also taking up the sidewise twisting movement of the tubing caused from the water pressure inside of the tubing. Any ordinary flexible shower spray can be put into or removed from the bracket with the bracket in place on the wall and without any need for disassembling any of the parts of either the bracket or the spray. In assembling the shower spray with the bracket, the shower spray is inserted from the bottom. As the water pressure within the tubing tends to push the same upwardly such water pressure will aid in keeping the spray parts in position and the latter will not slip out of place due to any increase in the flow of the water. The semi-flexible character of the wire of which the bracket is made makes it possible to bend the wire slightly so as to fit any popular size of tubing. By merely pulling or pushing the tubing immediately below the bracket the direction of discharge of the spray head can be adjusted. It can be placed so as to spray straight out or at any downwardly directed angle. The foot-like brace afforded at the bottom of the arm 12 against the wall acts as a fulcrum at that point and relieves the suction cups of the twisting and wrenching stresses to which the same are subjected in the ordinary types of vacuum cup shower brackets. Furthermore, by using two vacuum cups instead of one, each cup acts as a fulcrum with respect to the other in absorbing sidewise stresses.

I claim:

1. A shower spray support for application to a wall, comprising a pair of horizontally spaced rubber suction cups arranged in the same vertical plane, and a narrow outwardly projecting bracket midway between the cups provided with laterally extending portions which are attached at their ends to the cups and provided beneath the outwardly projecting portion with a downwardly extending arm which terminates below the cups in substantially the plane of the latter, said bracket and arm both being of open-work construction with closely arranged horizontally spaced side portions between which the rubber tubing of the spray is frictionally held at a plurality of points in a vertical plane when bent into the form of a gooseneck.

2. A shower spray support for application to a wall for holding a length of rubber tubing equipped with a spray head in position to produce a shower, comprising a narrow outwardly projecting bracket provided with means for receiving and holding an upwardly bowed section of tubing in a vertical plane, said bracket being provided with a downwardly extending portion directly beneath the outwardly projecting portion thereof for engagement with the wall, and being provided at its sides with laterally extending portions, and a pair of horizontally spaced rubber suction cups secured at opposite sides of the bracket to the outer ends of said laterally extending portion for engagement with the wall in laterally offset relation to the bracket, each of said laterally offset cups providing a side fulcrum against the wall for the other cup to withstand lateral movement of the outer end of the interposed bracket under the wreathing action of the tubing caused by the pressure of the water passing through the tubing, and the downwardly extending portion of the bracket providing a bottom fulcrum against the wall for both of the cups to withstand downward movement of the outer end of the bracket.

3. A shower spray support for application to a wall for holding a length of rubber tubing equipped with a spray head in position to produce a shower, comprising an outwardly projecting bracket provided with means for receiving and holding an upwardly bowed section of tubing in a vertical plane, said bracket being provided with a bracing portion for engagement with the wall and being also provided with laterally extending portions, and a pair of horizontally spaced rubber suction cups secured at opposite sides of the bracket to the outer ends of said laterally extending portions for adhering engagement with the wall in laterally offset relation to the bracket, each of said laterally offset cups providing a side fulcrum against the wall for the other cup to withstand sidewise movement of the outer end of the interposed bracket under the wreathing action of the tubing caused by the pressure of the water passing through the tubing, and the bracing portion of the bracket providing a bottom fulcrum against the wall for both of the cups to withstand vertical movement of the outer end of the bracket.

ORLOFF W. HOLDEN.